UNITED STATES PATENT OFFICE.

PATRICK S. DEVLAN, OF READING, PENNSYLVANIA.

IMPROVEMENT IN LUBRICATING COMPOUNDS.

Specification forming part of Letters Patent No. 6,028, dated January 16, 1849; Reissue No. 241, dated June 14, 1853.

*To all whom it may concern:*

Be it known that I, PATRICK S. DEVLAN, of Reading, Pennsylvania, have invented a new and useful composition of matter applicable as a substitute for oil, as an anti-attrition to the lubrication of machinery, and for other purposes, of which the following is a full, clear, and exact description thereof.

The nature of my invention consists in combining with animal or vegetable oil or other fatty matter—such as concrete fats—a solution of caoutchouc, or other similar gum dissolved in turpentine or other solvent.

The mode of procedure which I have pursued with success is as follows, viz: I heat in a suitable vessel eight gallons of water and dissolve in it one pound of glue or other gelatinous matter, and to this I add four pounds of carbonate of soda and twenty-four gallons of animal or vegetable oil or grease. As these various substances are added, the whole should be thoroughly stirred and mixed, and then I add one pound of caoutchouc, previously dissolved in turpentine or other solvent, taking care to stir while the solution of gum is being added, to insure the thorough admixture of the whole. Before the solution of gum is added, care should be taken to strain it, so as to avoid putting in any lumps or particles of undissolved gum.

The compound thus produced will be found to answer a better purpose for lubricating machinery than any other substance, simple or compound, known prior to my invention, as it will last longer, have a less tendency to heat, will be less liable to gum, and will resist a greater pressure without being forced out from between rubbing surfaces.

Several of the ingredients above enumerated may be dispensed with, although to produce a lubricator for heavy machinery alone, I prefer to use them all—as, for instance, a good lubricator may be produced by simply taking one pound of caoutchouc dissolved in turpentine or other solvent of that gum, and after being strained putting it into a suitable vessel and adding twenty-four gallons of animal or vegetable oil or melted grease, or any two of these substances, and stirring until the whole is thoroughly amalgamated. The great and the leading object is to amalgamate and thoroughly combine the gum with the oil or fatty matter, to give it body and render it more suitable as a lubricator, and although this can be best effected with the other substances first enumerated, yet these may be dispensed with without material injury for lubricating light machinery.

Instead of caoutchouc, any of the other gums possessing the same essential properties—such as gutta-percha—may be substituted, although I prefer caoutchouc. And so of the fatty matter. Any of the fatty substances such as have heretofore been used for lubricating may be substituted for the animal or vegetable oils, although a mixture of oil and concrete fats will be found equally good and more economic.

I do not wish to confine myself to the proportions above given, as these may be varied without materially changing the result.

What I claim as my invention, and desire to secure by Letters Patent, is—

The combination of a solution of caoutchouc or other similar gum with animal or vegetable oil or fatty matter, substantially as specified, applicable as a substitute for oil in lubricating machinery, and for other purposes.

PATRICK S. DEVLAN.

Witnesses:

CHARLES D. FREEMAN,
GEO. R. DUNN.